US008894223B2

(12) United States Patent
Iseki

(10) Patent No.: US 8,894,223 B2
(45) Date of Patent: Nov. 25, 2014

(54) COMMON BASE FOR MANUALLY RETRACTABLE AND ELECTRICALLY RETRACTABLE VEHICLE DOOR MIRRORS, MANUALLY RETRACTABLE VEHICLE DOOR MIRROR, ELECTRICALLY RETRACTABLE VEHICLE DOOR MIRROR, AND METHOD FOR SELECTIVELY MANUFACTURING MANUALLY RETRACTABLE/ELECTRICALLY RETRACTABLE VEHICLE DOOR MIRROR

(75) Inventor: Kota Iseki, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 772 days.

(21) Appl. No.: 12/961,911

(22) Filed: Dec. 7, 2010

(65) Prior Publication Data
US 2011/0141591 A1 Jun. 16, 2011

(30) Foreign Application Priority Data
Dec. 11, 2009 (JP) ................................ 2009-281435

(51) Int. Cl.
| *B60R 1/06* | (2006.01) |
| *B60R 1/074* | (2006.01) |
| *G02B 7/182* | (2006.01) |
| *B60R 1/078* | (2006.01) |

(52) U.S. Cl.
CPC ............... *B60R 1/074* (2013.01); *B60R 1/078* (2013.01); *Y10S 359/90* (2013.01)
USPC .......................................... 359/841; 359/900

(58) Field of Classification Search
CPC ............ B60R 1/06; B60R 1/064; B60R 1/07; B60R 1/074

USPC .................................. 359/841, 872, 877, 900
See application file for complete search history.

(56) References Cited

U.S. PATENT DOCUMENTS

| 4,626,083 A | * | 12/1986 | Nakayama et al. | ........... 359/841 |
| 4,626,084 A | * | 12/1986 | Kumai | ........... 359/841 |
| 4,789,232 A | * | 12/1988 | Urbanek | ........... 248/549 |

(Continued)

FOREIGN PATENT DOCUMENTS

| JP | 8-34287 A | 2/1996 |
| JP | 2008-296719 | 12/2008 |
| JP | 2009-536118 | 10/2009 |

OTHER PUBLICATIONS

Japan Office action, dated Jul. 2, 2013 along with an engish translation thereof.

*Primary Examiner* — Ricky D Shafer
(74) *Attorney, Agent, or Firm* — Greenblum & Bernstein, P.L.C.

(57) ABSTRACT

The present invention provides a base which can be used for both manually retractable vehicle door mirror in which a shaft is placed on a rotating side and electrically retractable vehicle door mirror in which a shaft is placed on a stationary side. A base includes a car body fixing section and rotation support section. The rotation support section is equipped with an upright shaft fastening surface on which a shaft of an electric drive mechanism of an electrically retractable door mirror is fastened upright. A center hole is formed in a central part of the upright shaft fastening surface to rotatably pass a shaft formed on a rotating side of a manually retractable door mirror. An annular wall housing groove is formed on an outer circumferential side of the upright shaft fastening surface to rotatably house an annular wall formed coaxially with the shaft on the rotating side of the manually retractable door mirror.

12 Claims, 13 Drawing Sheets

(56) References Cited

U.S. PATENT DOCUMENTS

| | | | |
|---|---|---|---|
| 5,514,940 A * | 5/1996 | Okamoto | 318/469 |
| 5,579,178 A * | 11/1996 | Mochizuki | 359/841 |
| 5,781,354 A * | 7/1998 | Sakata | 359/841 |
| 6,132,050 A | 10/2000 | Sakata et al. | |
| 6,133,704 A * | 10/2000 | Yoshida et al. | 318/466 |
| 6,322,221 B1 * | 11/2001 | van de Loo | 359/841 |
| 6,447,129 B2 * | 9/2002 | Hayashi et al. | 359/879 |
| 6,874,896 B2 * | 4/2005 | Yoshida | 359/841 |
| 7,137,717 B2 * | 11/2006 | Ohashi | 359/877 |
| 7,441,912 B2 * | 10/2008 | Onuki | 359/841 |
| 8,550,641 B2 * | 10/2013 | Iseki | 359/841 |
| 8,708,505 B2 * | 4/2014 | Iseki | 359/841 |
| 2008/0297927 A1 | 12/2008 | Onuki | |
| 2009/0147388 A1 | 6/2009 | Mendoza | |

* cited by examiner

COMMON BASE FOR MANUALLY RETRACTABLE AND ELECTRICALLY RETRACTABLE VEHICLE DOOR MIRRORS, MANUALLY RETRACTABLE VEHICLE DOOR MIRROR, ELECTRICALLY RETRACTABLE VEHICLE DOOR MIRROR, AND METHOD FOR SELECTIVELY MANUFACTURING MANUALLY RETRACTABLE/ELECTRICALLY RETRACTABLE VEHICLE DOOR MIRROR

The disclosure of Japanese Patent Application No. JP2009-281435 filed on Dec. 11, 2009 including the specification, drawings, claims and abstract is incorporated herein by reference in its entirety.

BACKGROUND OF THE INVENTION

1. Field of the Invention

The present invention relates to a base which can be used for both a manually retractable vehicle door mirror (hereinafter referred to as a manually retractable door mirror) and electrically retractable vehicle door mirror (hereinafter referred to as an electrically retractable door mirror), a manually retractable door mirror which uses the base, an electrically retractable door mirror which uses the base, and a method for selectively manufacturing the manually retractable door mirror or electrically retractable door mirror using the base.

2. Description of the Related Art

A technique for selectively configuring a manually retractable door mirror or electrically retractable door mirror by selectively assembling a manually retractable or electrically retractable unit onto a common housing and base for manually retractable and electrically retractable door mirrors is described in Japanese Patent Laid-Open No. 8-34287.

The technique described in Japanese Patent Laid-Open No. 8-34287 is applied to a configuration in which shafts of both manually retractable door mirror and electrically retractable door mirror are placed on a stationary side to rotatably support a housing, and is not applicable when the shaft of the manually retractable door mirror is placed on a rotating side and the shaft of the electrically retractable door mirror is placed on the stationary side.

SUMMARY OF THE INVENTION

The present invention has been made in view of the above problem and provides a common base for manually retractable and electrically retractable door mirrors, which can be applied when a shaft of a manually retractable door mirror is placed on a rotating side and a shaft of an electrically retractable door mirror is placed on a stationary side. Also, the present invention provides a manually retractable door mirror and electrically retractable door mirror which use the common base for manually retractable and electrically retractable door mirrors. Furthermore, the present invention provides a method for selectively manufacturing the manually retractable door mirror or electrically retractable door mirror using the common base for manually retractable and electrically retractable door mirrors.

The present invention provides a common base for manually retractable and electrically retractable door mirrors comprising a car body fixing section attached to an outer side of a car body, and a rotation support section which, being integral with the car body fixing section, rotatably supports a mirror rotating member and moves the mirror rotating member between a retracted position and a return position, the common base further comprising on an upper side of the rotation support section: an upright shaft fastening surface on which a first shaft is fastened upright, where the first shaft forms a rotating shaft for the mirror rotating member of an electrically retractable door mirror; a center hole formed in a center of the upright shaft fastening surface to rotatably pass a second shaft formed along a rotation axis of the mirror rotating member by protruding downward from the mirror rotating member when the base is used for a manually retractable door mirror, or to pass a harness drawn downward through the first shaft fastened upright on the upright shaft fastening surface when the base is used for the electrically retractable door mirror; and an annular wall housing groove formed into a circular shape coaxially with the center hole on an outer circumferential side of the center hole and used to rotatably house an annular wall of the mirror rotating member when the base is used for the manually retractable door mirror, where the annular wall is placed coaxially with the second shaft of the mirror rotating member at a location on an outer circumferential side of the second shaft by extending downward. According to the common base for manually retractable and electrically retractable door mirrors, when the common base is used for the electrically retractable door mirror, the first shaft is fastened upright on the upright shaft fastening surface and the mirror rotating member is rotatably supported on the first shaft. When the common base is used for the manually retractable door mirror, the second shaft installed on the side of the mirror rotating member is passed through the center hole of the base and the annular wall on the side of the mirror rotating member is housed in the annular wall housing groove on the side of the base, thereby rotatably supporting the mirror rotating member. In this way, the present invention allows the same base to be used for both manually retractable and electrically retractable door mirrors.

The common base for manually retractable and electrically retractable door mirrors according to the present invention may further comprise a base-side portion of a clutch which is engaged with a mirror-rotating-member-side portion of the clutch when the base is used for the manually retractable door mirror, where the base-side portion of the clutch is formed into a concavo-convex shape by being exposed upward at a location on the outer circumferential side of the center hole of the rotation support section and extending around the rotation axis while the mirror-rotating-member-side portion of the clutch is formed on the side of the mirror rotating member into a concavo-convex shape corresponding to the concavo-convex shape of the base-side portion of the clutch. The base-side portion of the clutch may be formed, for example, on the inner circumferential side of the annular wall housing groove. This eliminates the need for a exclusive width used for placing the clutch on a radially outer side of the annular wall housing groove. Alternatively, the base-side portion of the clutch may be formed in the bottom of the annular wall housing groove. This eliminates the need for a exclusive radial width used for placing the clutch, making it possible to reduce the diameter of the base and the mirror rotating member at the portion where the base rotates relative to the mirror rotating member. Also, the common base for manually retractable and electrically retractable door mirrors according to the present invention may comprise a concavo-convex structure for positioning of the first shaft on the upright shaft fastening surface. This makes it easy to position the first shaft stably.

The present invention provides a manually retractable door mirror comprising: the common base for manually retractable and electrically retractable door mirrors according to the present invention; the mirror rotating member equipped with the second shaft and the annular wall and rotatably supported on the base while rotatably passing the second shaft into the center hole in the upright shaft fastening surface of the base and rotatably housing the annular wall in the annular wall housing groove of the base; and a spring which is fitted, in a compressed state, over the second shaft passing through the center hole in the upright shaft fastening surface and protruding toward the underside of the base, and applies an urging force in such a direction along the rotation axis as to push the base and the mirror rotating member toward each other. The manually retractable door mirror can be configured using the common base for manually retractable and electrically retractable door mirrors according to the present invention.

The present invention provides a manually retractable door mirror comprising: the common base for manually retractable and electrically retractable door mirrors according to the present invention; the mirror rotating member equipped with the second shaft, the annular wall, and the mirror-rotating-member-side portion of the clutch and rotatably supported on the base while rotatably passing the second shaft into the center hole in the upright shaft fastening surface of the base and rotatably housing the annular wall in the annular wall housing groove of the base; and a spring which is fitted, in a compressed state, over the second shaft passing through the center hole in the upright shaft fastening surface and protruding toward the underside of the base, applies an urging force in such a direction along the rotation axis as to push the base and the mirror rotating member toward each other and thereby brings the mirror-rotating-member-side portion and base-side portion of the clutch into pressing contact with each other. The manually retractable door mirror can be configured using the common base for manually retractable and electrically retractable door mirrors according to the present invention.

The present invention provides an electrically retractable door mirror comprising: the common base for manually retractable and electrically retractable door mirrors according to the present invention; the first shaft fastened upright on the upright shaft fastening surface; the mirror rotating member which is rotatably supported around an axis of the first shaft and rotatably driven on the first shaft by a rotating force transmitted from a built-in electric drive mechanism. The electrically retractable door mirror can be configured using the common base for manually retractable and electrically retractable door mirrors according to the present invention.

The present invention provides a method for selectively manufacturing a manually retractable/electrically retractable door mirror, wherein the method manufactures the manually retractable door mirror according to the present invention using one unit of the common base for manually retractable and electrically retractable door mirrors according to the present invention and manufactures the electrically retractable door mirror according to the present invention using another unit of the common base for manually retractable and electrically retractable door mirrors according to the present invention. The method for selectively manufacturing a manually retractable/electrically retractable door mirror can selectively manufacture the manually retractable door mirror or electrically retractable door mirror using the common base for manually retractable and electrically retractable door mirrors according to the present invention.

DETAILED DESCRIPTION OF THE PREFERRED EMBODIMENTS

First Embodiment of Manually Retractable Door Mirror

Figure 1:
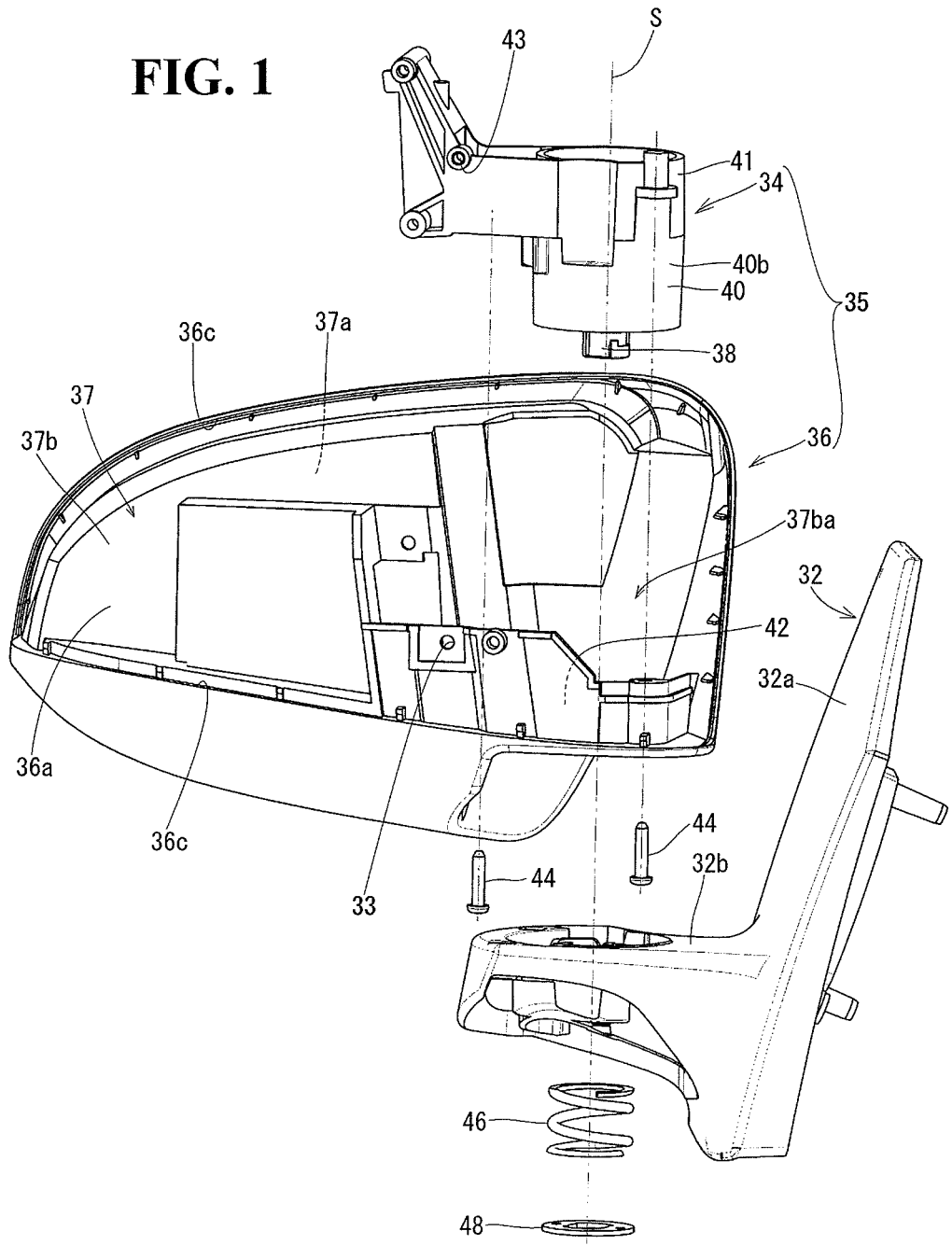
FIG. 1 is an exploded perspective view showing principal part of a first embodiment of a manually retractable door mirror according to the present invention configured using a common base for manually retractable and electrically retractable door mirrors according to the present invention.

A first embodiment of a manually retractable door mirror according to the present invention configured using a common base for manually retractable and electrically retractable door mirrors according to the present invention will be described. FIG. 1 is an exploded view showing a configuration of a manually retractable vehicle door mirror according to the present embodiment. This is a right door mirror as viewed from the rear. A housing cover mounted on the rear side of a housing (mirror body) 36, a mirror angle adjustment actuator fixedly placed in a front space 37a (FIG. 4) of the housing 36, a mirror plate fixedly supported by the mirror angle adjustment actuator in the state where the mirror angle can be adjusted, and so on are not shown in FIG. 1. The door mirror includes a base 32 attached to an outer side of a car body, a housing support member 34 (frame) bearing-supported on the base 32 in such a way as to be able to rotate around a rotation axis S, and a housing 36 fixedly supported by the housing support member 34.

Figure 7:
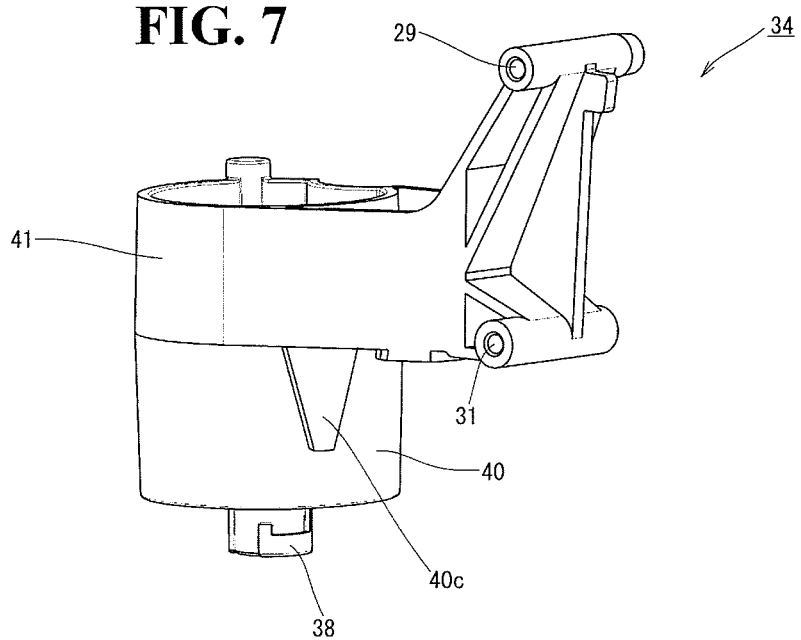
FIG. 7 is a perspective view of the housing support member 34 in FIG. 1 as viewed from the side on which a stopper 40c is formed.

The housing 36 houses the housing support member 34 in a depression 42 in an inner space 37, places the housing support member 34 in a housing support member placement space 37ba, and is fixedly supported by the housing support member 34 with screws 44. In this way, the housing support member 34 and housing 36 are integrated by being fixedly coupled to each other, to form a mirror rotating member 35. When the housing support member 34 and housing 36 are integrated, a shaft 38 of the housing support member 34 and annular wall 40 on an outer circumferential side of the shaft 38 protrude downward from an undersurface of the housing 36. The shaft 38 and annular wall 40 are inserted, respectively, into a shaft passage hole 56 and annular wall housing groove 58 (FIGS. 8 and 9) formed in a rotation support section 32b of the base 32, a coil spring 46 is fitted, in a shortened (compressed) state, over the shaft 38 from under the base 32, and a plate 48 is attached to a lower end of the shaft 38, thereby coupling the housing support member 34 and base 32 together. Consequently, the housing 36 can be moved among a retracted position (backward folded position), return position, and forward tilted position (forward folded position) by being rotated manually together with the housing support member 34 around the rotation axis S within an angular range permitted by a stopper 40c (FIG. 7).

Figure 3:
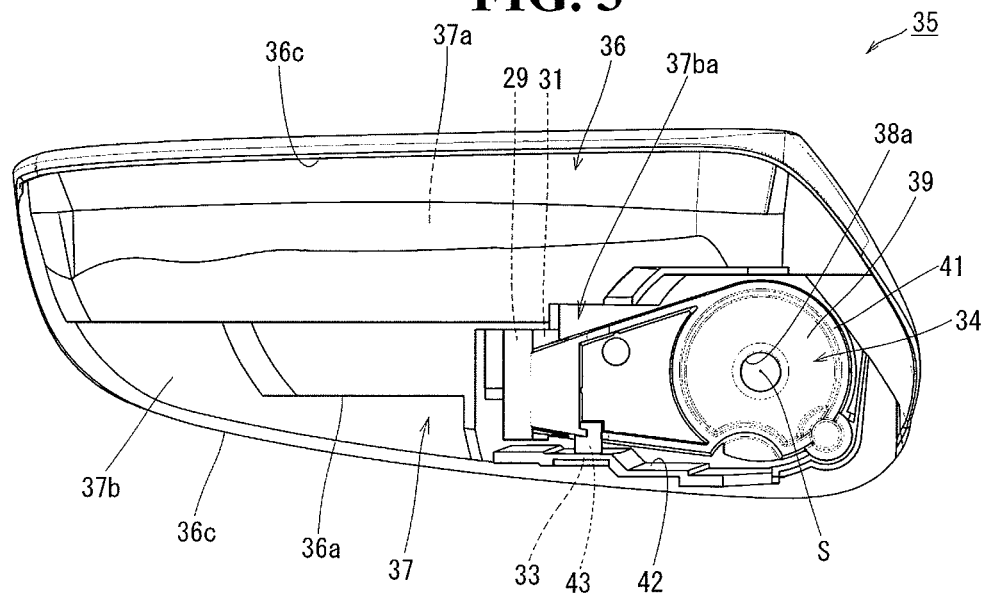
FIG. 3 is a plan view showing how a housing support member 34 is housed in a depression 42 in a housing 36 and placed in a housing support member placement space 37ba, in the manually retractable door mirror shown in FIG. 1.
Figure 4:
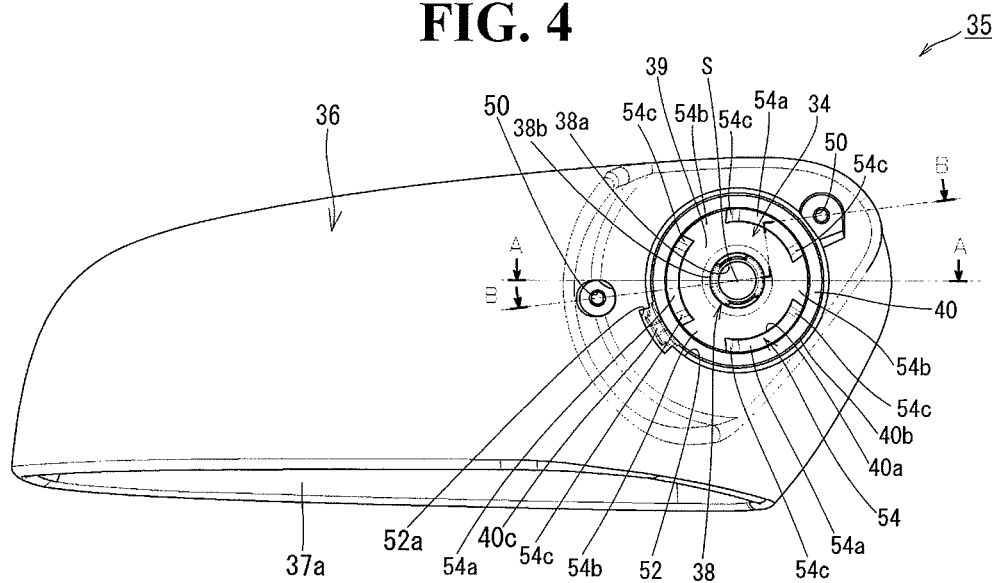
FIG. 4 is a bottom view of the assembled components shown in FIG. 3.
Figure 6:
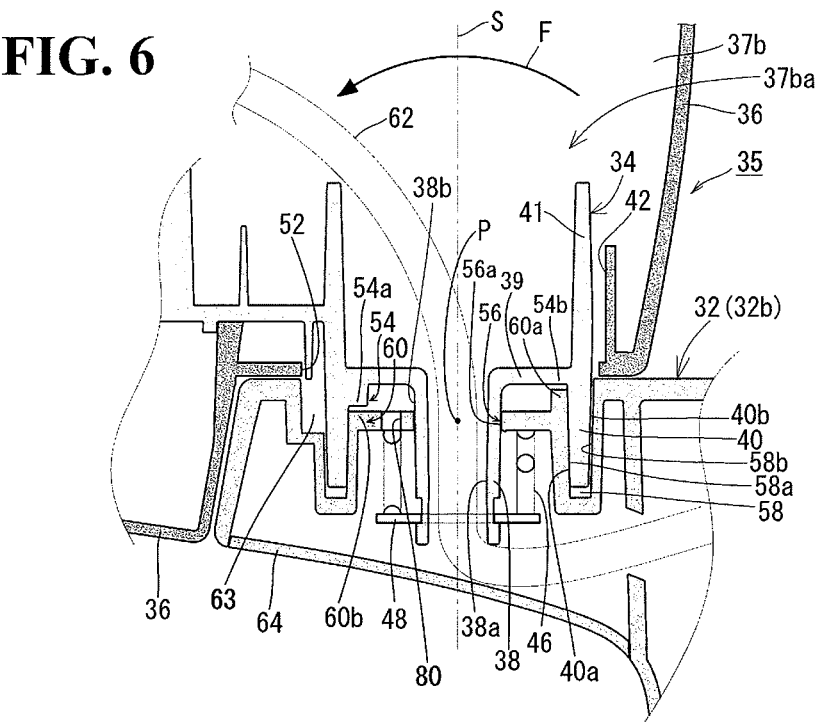
FIG. 6 is a partial sectional view (which corresponds to a cross section taken along line A-A in FIGS. 4 and 8) of a manually retractable door mirror in FIG. 1 cut along a plane passing through a rotation axis S when a housing 36 is at a return position.
Figure 12:
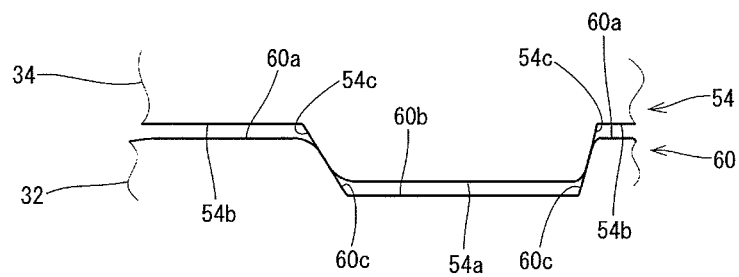
FIG. 12 is partially enlarged front view showing how a base-side portion 60 and mirror-rotating-member-side portion 54 of a clutch are meshed with each other when the housing 36 of the door mirror in FIG. 1 is at a return position.

The housing support member 34, housing 36, and base 32 in FIG. 1 will be described. The housing support member 34 is a one-piece molding of rigid plastics such as PA+GF (glass fiber filled polyamide) resin or a one-piece casting of metal such as aluminum. As shown in HG. 1, the housing support member 34 includes the shaft 38 which rotates relative to the base 32 by being shaped as a hollow round bar and placed on the rotation axis S, and the annular wall 40 which is circular in shape, located outwardly away from the shaft 38, and formed coaxially with the shaft 38 by being radially spaced from the shaft 38. Since the shaft 38 is formed integrally with the housing support member 34, there is no need for a shaft as an independent part. This reduces the number of parts and thereby improves efficiency of assembly operations. The annular wall 40 becomes slightly thinner ire plate thickness toward the bottom (FIG. 6). The annular wall 40 protrudes upward beyond a disk-shaped coupler 39 (FIGS. 3 and 6) joining the annular wall 40 and shaft 38 and forms an annular wall extension 41. The annular wall extension 41 serves to increase rigidity of the annular wall 40. As shown in FIG. 6, in a space surrounded by the annular wall 40, coupler 39, and shaft 38, a mirror-rotating-member-side portion 54 of a clutch is formed on a boundary between the coupler 39 and annular wall 40 (just inside the annular wall 40), being placed coaxially with the shaft 38 and annular wall 40. As shown in FIG. 4, the mirror-rotating -member-side portion 54 of the clutch includes a ridge 54a and trough 54b repeated three times at equal intervals in a circumferential direction. Each boundary 54c between ridge 54a and trough 54b (which is an example of a concavo-convex shape) is formed to be an inclined surface (FIG. 12). As shown in FIG. 7, in some circumferential area on an outer circumferential surface of the annular wall 40, the stopper 40c is formed, protruding radially outward. Being placed in a stopper traveling groove 63 at a location just on the outer circumferential side of the annular wall housing groove 58 of the base 32 in FIG, 8, the stopper 40c moves along the stopper traveling groove 63 as the housing support member 34 rotates and is restrained by abutting against opposite ends 63a and 63b of the stopper traveling groove 63, where the stopper traveling groove 63 is formed in some circumferential area around the rotation axis S. The stopper 40c is restrained by the end 63a at the forward folded position of the housing 36 and restrained by the end 63b at the retracted position (backward folded position) of the housing 36. Since the stopper 40c is formed on the outer circumferential surface of the annular wall 40, the stopper 40c can be supported more firmly than when the stopper 40c is coupled to the housing support member 34 by its base alone without the annular wall 40. This prevents the stopper 40c from being broken. Conversely, the stopper traveling groove 63 may be formed at a location just on the inner circumferential side of the annular wall housing groove 58 and the stopper 40c may be formed on an inner circumferential surface of the annular wall 40, protruding therefrom, As shown in FIG. 7, on the front side of the housing support member 34, screw holes 29 and 31 are formed to screw and support part of the mirror angle adjustment actuator.

Figure 2:
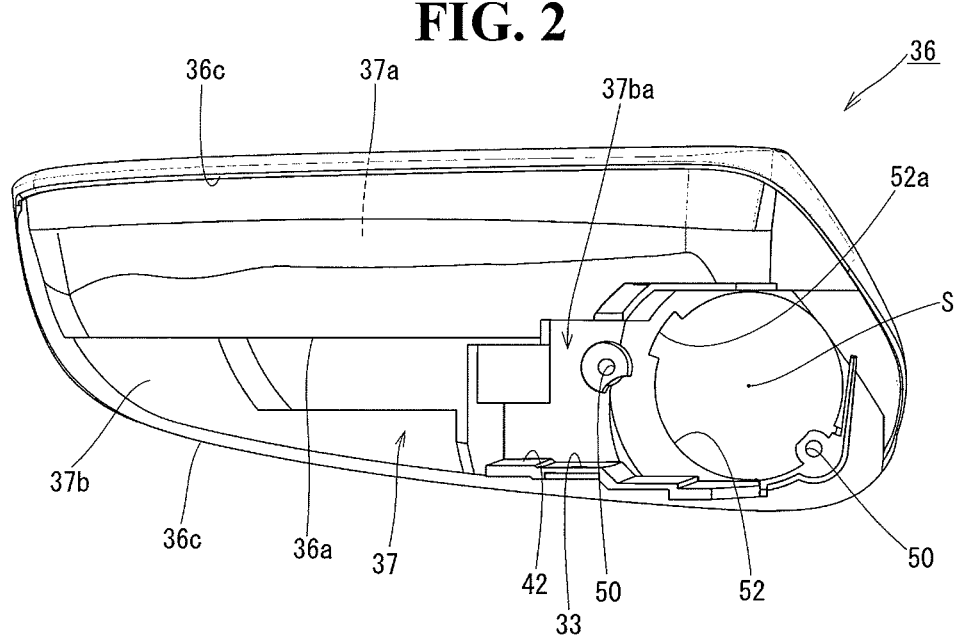
FIG. 2 is a plan view of a housing 36 alone of the manually retractable door mirror in FIG. 1.
Figure 17:
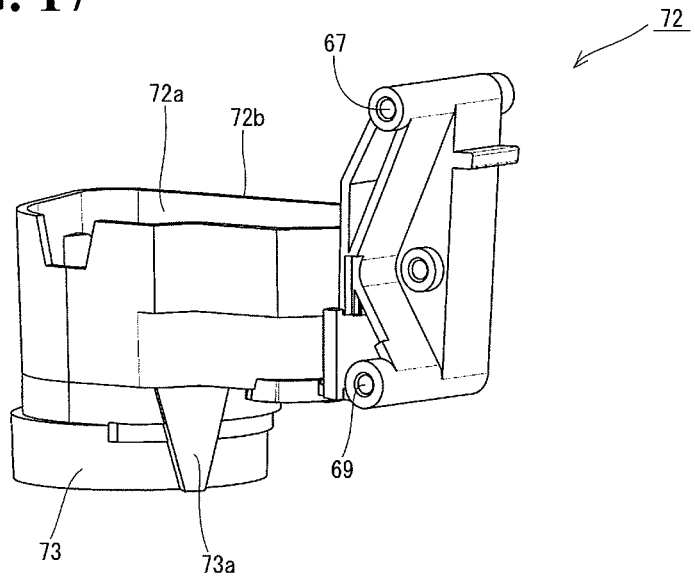
FIG. 17 is a perspective view of a fitting 72 in FIG. 16 as viewed from the side on which a stopper 73a is formed.

The housing 36 in FIG. 1 is a one-piece molding of plastics such as ABS lower in rigidity than the housing support member 34. As shown in FIG. 1, the inner space 37 of the housing 36 is generally partitioned by a partition plate 36a into the front space 37a and a rear space 37b. The mirror angle adjustment actuator (not shown) is housed in the front space 37a (FIG. 4) by being placed in front of the partition plate 36a. That is, part of the mirror angle adjustment actuator is secured with screws to screw holes (not shown) formed in a front face of the partition plate 36a while other part of the mirror angle adjustment actuator is secured with screws to the screw holes 29 and 31 (FIG. 7) in the front side of the housing support member 34. A mirror plate (not shown) is mounted on the mirror angle adjustment actuator. The housing support member placement space 37ba (in common with an electric drive mechanism placement space of an electrically retractable door mirror) (FIG. 1) is formed in the rear space 37b to allow the housing support member 34 to be placed by being inserted from above. The depression 42 (FIGS. 1, 2, 3 and 5) is formed in lower part of the housing support member placement space 37ba by opening upward. The housing support member 34 is housed in the depression 42. A screw through-hole 33 (FIG. 1) is formed in the rear side of the housing 36. A screw (not shown) is inserted into the screw through-hole 33 and screwed into a screw hole 43 (FIG. 1) formed in the rear side of the housing support member 34. Consequently, the housing 36 and housing support member 34 are fastened to each other from the rear side of the housing 36 as well. The rear space 37b of the housing 36 is closed by a housing cover (not shown) mounted thereon. A round hole 52 (FIG. 2) is formed on the rotation axis S in the bottom of the housing 36 to allow the shaft 38 of the housing support member 34 and the annular wall 40 to protrude. A recess 52a (FIGS. 2, 4, 13 and 19) is formed in the round hole 52 to pass the stoppers 40c (FIGS. 7) and 73a (FIG. 17).

Figure 8:
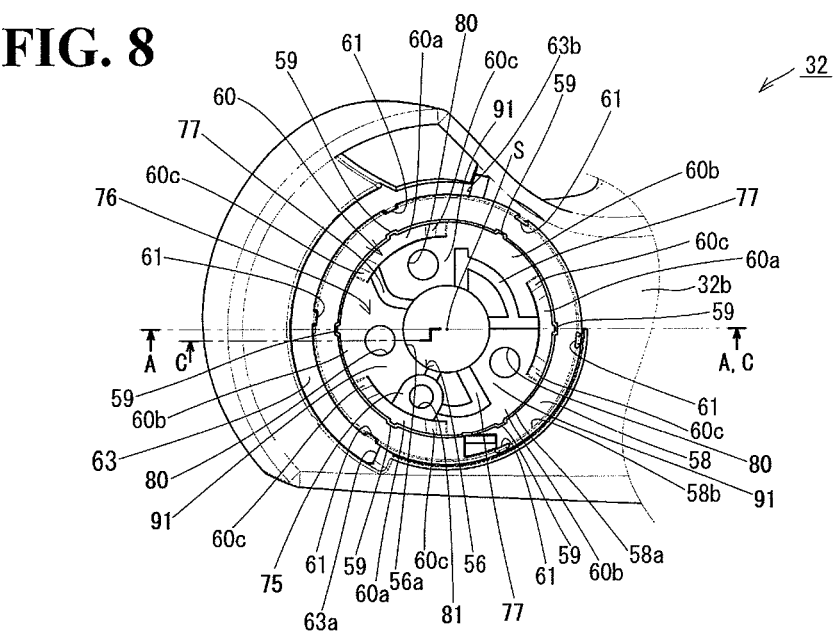
FIG. 8 is a plan view of a rotation support section 32b of a base 32 in FIG. 1.
Figure 9:
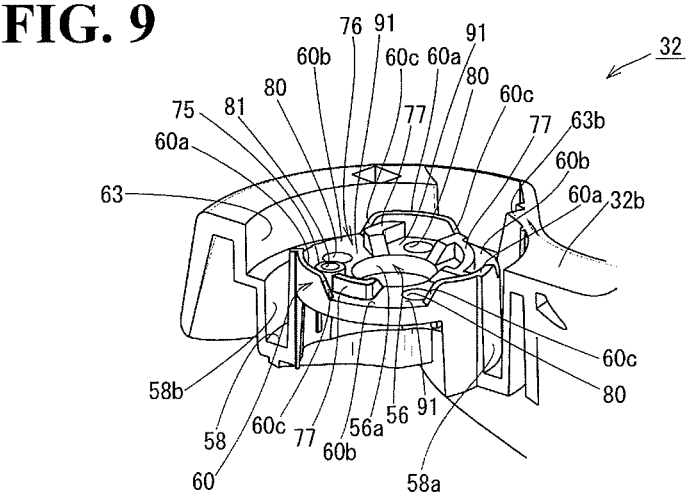
FIG. 9 is a partially cut-away perspective view of the rotation support section 32b of the base 32 in FIG. 1.

The base 32 (the common base for manually retractable and electrically retractable door mirrors) is a one-piece molding of rigid plastics such as PA+GF resin or a one-piece casting of metal such as aluminum. The base 32 includes a car body fixing section 32a fastened to the car body and the rotation support section 32b which protrudes laterally from a lower end of the car body fixing section 32a and provides bearing support to rotatably support the housing support member 34. FIG. 8 shows the rotation support section 32b of the base 32 as viewed from above. FIG. 9 is a partially cutaway perspective view of the rotation support section 32b. The rotation support section 32b includes the shaft passage hole 56 formed on the rotation axis S, the annular wall housing groove 58 formed on the outer circumferential side of the shaft passage hole 56, and the clutch's base-side portion 60 formed coaxially with the annular wall housing groove 58 and the shaft passage hole 56 just on the inner circumferential side of the annular wall housing groove 58. The shaft passage hole 56 is designed to be just large enough to pass the shaft 38 with slight clearance when the housing 36 is at the return position. On an inner wall surface 58a and outer wall surface 58b of the annular wall housing groove 58, to define abutting positions with respect to an inner wall surface 40a and outer wall surface 40b of the annular wall 40) (FIG. 6), six ribs 59 or 61 each are formed in protrusion at equal circumferential angles, extending in a direction parallel to the rotation axis S. The annular wall housing groove 58 and annular wall 40 have such an inside diameter and outside diameter, respectively, that the inner wall surface 58a (positions of the ribs 59) and inner wall surface 40a as well as the outer wall surface 58b (positions of the ribs 61) and outer wall surface 40b will abut each other without clearance when the housing 36 is at the return position. Groove width of the annular wall housing groove 58 decreases slightly toward the bottom (FIG. 6) to suit changes in the plate thickness of the annular wall 40. Depth of the annular wall housing groove 58 is designed to be large enough for the mirror-rotating-member-side portion 54 and base-side portion 60 of the clutch to always abut each other, within an angular range in which the housing support member 34 can rotate relative to the base 32. The base-side portion 60 of the clutch includes a ridge 60a and trough 60b repeated three times at equal intervals in a circumferential direction just on the inner circumferential side of the annular wall housing groove 58 (FIGS. 8 and 9). Each boundary 60c between ridge 60a and trough 60b (which is an example of a concavo-convex shape) is formed to be an inclined surface (FIGS. 9 and 12).

The manually retractable door mirror in FIG. 1 is assembled, for example, as follows.

Figure 5:
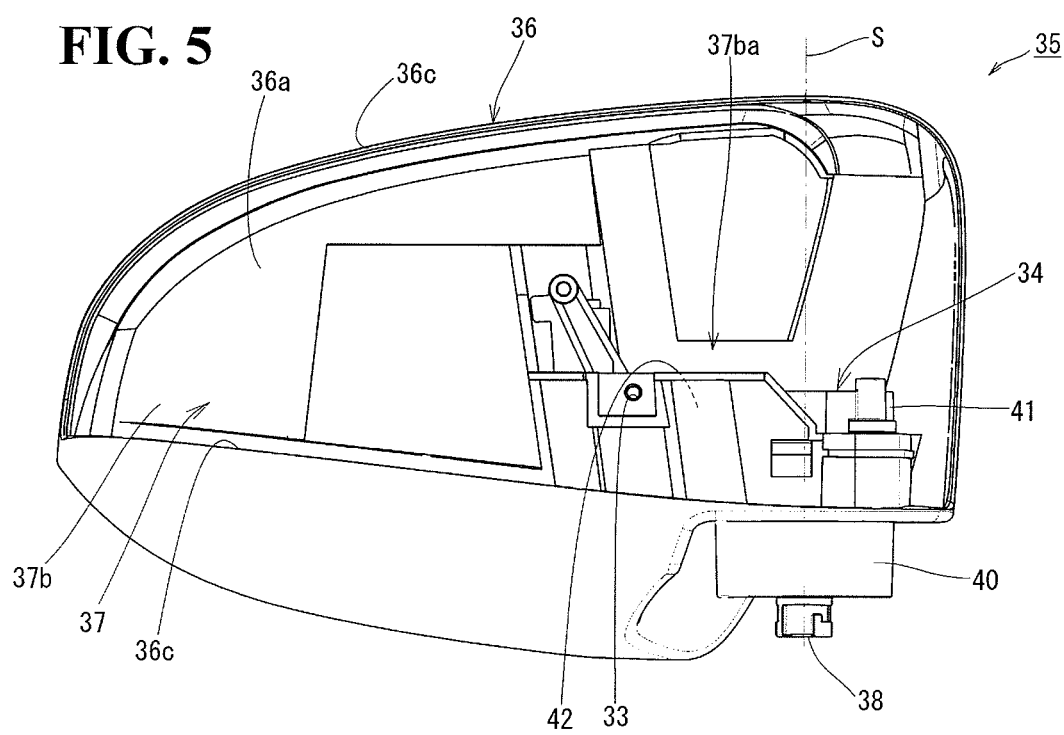
FIG. 5 is a rear view of the assembled components shown in FIG. 3.

(1) The housing support member 34 is housed in the depression 42 of the housing 36 and placed in the housing support member placement space 37ba. FIGS. 3, 4 and 5 are a plan view, bottom view, and rear view showing the assembled components.

Figure 11:
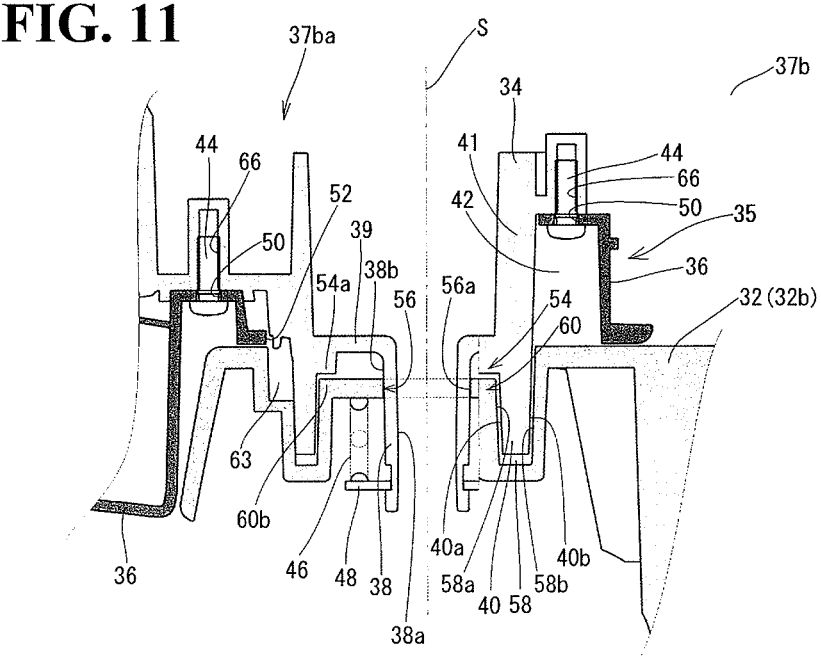
FIG. 11 is a partial sectional view (which corresponds to a cross section taken along line B-B in FIG. 4) of the housing support member 34 and housing 36 of the door mirror in FIG. 1, at a position where the components are fixedly coupled.

(2) Screws 44 (FIG. 1) are inserted through two screw through-holes 50 (FIG. 4) formed in the undersurface of the housing 36 and are screwed into a screw hole formed in the undersurface of the housing support member 34 to fixedly couple the housing 36 and housing support member 34 to each other. FIG. 11 shows a cross section (which corresponds to a cross section taken along line B-B in FIG. 4) taken at the position where the housing support member 34 and housing 36 are fixedly coupled. The housing support member 34 and housing 36 are fixedly coupled to each other as the screws 44 are inserted through the screw through-holes 50 formed in the housing 36 and screwed into screw holes 66 formed in the housing support member 34.

Figure 10:
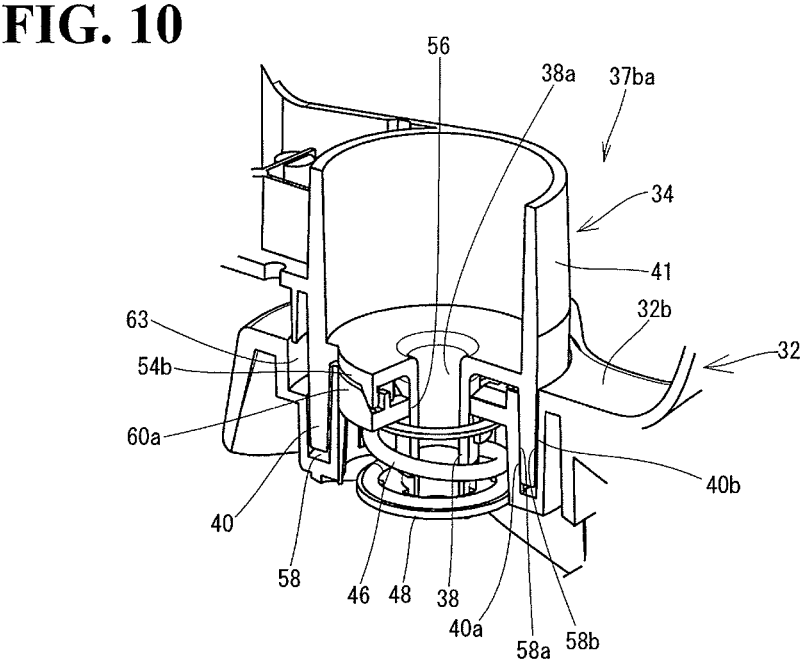
FIG. 10 is a partially cut-away perspective view of the manually retractable door mirror shown in FIG. 1.

(3) The shaft 38 and annular wall 40 protruding downward from the round hole 52 in the undersurface of the housing 36 are rotatably inserted, respectively, into the shaft passage hole 56 and annular wall housing groove 58 formed in the rotation support section 32b of the base 32 (FIGS. 6, 10 and 11).

(4) The coil spring 46 is fitted over the shaft 38 protruding to the underside of the base 32, the plate 48 is attached to the lower end of the shaft 38, thereby compressing the coil spring 46 fitted around the shaft 38, and consequently the housing 36 is coupled to the base 32 for bearing support via the housing support member 34 in such a way as to be able to rotate around the rotation axis S (FIGS. 6, 10 and 11).

(5) A screw (not shown) is inserted into the screw through-hole 33 (FIG. 1) in the rear side of the housing 36 and screwed into the screw hole 43 (FIG. 1) in the housing support member 34 to reinforce the coupling between the housing 36 and housing support member 34.

(6) The housing cover is attached to an opening (a region surrounded by edges 36c shown in FIGS. 1, 2, 3 and 5) in the back surface side of the housing 36. Consequently, the housing support member 34 excluding the shaft 38 and annular wall 40 protruding from the undersurface of the housing 36, i.e., part of the housing support member 34, which is above the coupler 39, has been housed in the inner space 37 of the housing 36.

(7) The mirror angle adjustment actuator is mounted in the front space 37a of the housing 36, and then the mirror plate is mounted on the mirror angle adjustment actuator.

FIG. 6 shows the door mirror in FIG. 1 assembled and cut along a plane passing through the rotation axis S when the housing 36 is at the return position (corresponding to a cross section taken along line A-A in FIGS. 4 and 8). A harness 62 is passed through a hollow part 38a of the shaft 38 to supply electric drive power to the mirror angle adjustment actuator and the like. A lower opening of the base 32 is closed by a lid 64. When the housing 36 is at the return position, an urging force of the coil spring 46 acts to push the base 32 and the housing support member 34 toward each other along the rotation axis S, bringing the ridges 60a and troughs 60b of the base-side portion 60 (FIGS. 8 and 9) of the clutch into mesh (state shown in FIG. 12) with the troughs 54b and ridges 54a of the mirror-rotating-member-side portion 54 (FIG. 4). Consequently, the housing support member 34 with the housing 36 mounted is held in standing position on the base 32. In so doing, the inner wall surface 40a and outer wall surface 40b of the annular wall 40 come into abutment with the ribs 59 and 61 on the inner wall surface 58a and outer wall surface 58b of the annular wall housing groove 58, holding the housing 36 at the return position without wobble. There is slight clearance between an outer circumferential surface 38b of the shaft 38 and inner circumferential surface 56a of the shaft passage hole 56.

When the housing 36 is at the return position, if a force is applied manually to the housing 36 in a direction around the rotation axis S against the urging force of the coil spring 46, the inclined surface 54c (FIG. 12) of the mirror-rotating-member-side portion 54 of the clutch slides upward along the inclined surface 60c of the base-side portion 60, causing the clutch to come out of mesh. As the inclined surface 54c slides upward, the housing support member 34 moves upward accordingly. Since the plate thickness of the annular wall 40 decreases slightly toward the bottom and the groove width of the annular wall housing groove 58 decreases slightly toward the bottom to suit changes in the plate thickness of the annular wall 40 (FIG. 6) as described above, when the housing support member 34 moves upward, the abutment of the inner wall surface 40a and outer wall surface 40b of the annular wall 40 with the ribs 59 and 61 on the inner wall surface 58a and outer wall surface 58b of the annular wall housing groove 58 is eased (clearance is created between the wall surfaces), allowing the housing 36 to rotate around the rotation axis S. Consequently, the housing 36 moves to the retracted position (backward folded position) or to the forward tilted position opposite the retracted position.

When the housing 36 rotates, bearing support is provided by sliding of the inner wall surface 40a and outer wall surface 40b of the annular wall 40 along the inner wall surface 58a and outer wall surface 58b of the annular wall housing groove 58 and/or sliding of the outer circumferential surface 38b of the shaft 38 along the inner circumferential surface 56a of the shaft passage hole 56.

When the housing 36 is at the return position, if an unexpected force (e.g., a downward load) is applied to the housing 36, increasing a bending moment (a moment oriented in the direction indicated by arrow F, i.e., a moment around a center position P of the shaft passage hole 56 in FIG. 6) exerted on the housing support member 34, and thereby causing the housing support member 34 to tilt, the inner wall surface 40a and outer wall surface 40b of the annular wall 40 come into pressing abutment with the ribs 59 and 61 on the inner wall surface 58a and outer wall surface 58b of the annular wall housing groove 58 while the outer circumferential surface 38b of the shaft 38 comes into pressing abutment with the inner circumferential surface 56a of the shaft passage hole 56 due to tilting of the shaft 38, and consequently, the unexpected force is shared and borne by the three pairs of surfaces in pressing abutment. Therefore, the housing support member 34 provides high rigidity and high bearing capacity for external forces as a whole. Thus, even if the housing support member 34 is made of a one-piece molding of rigid plastics such as PA+GF resin instead of metal, it is possible to prevent the shaft 38 and annular wall 40 from being bent or broken. If each of the housing support member 34 and base 32 is made of a one-piece molding of rigid plastics such as PA+GF resin, the door mirror can be manufactured at low costs. According to the present embodiment, in particular, when the housing 36 is at the return position, since the inner wall surface 40a and outer wall surface 40b of the annular wall 40 abut the ribs 59 and 61 on the inner wall surface 58a and outer wall surface 58b of the annular wall housing groove 58 without clearance while the outer circumferential surface 38b of the shaft 38 and the inner circumferential surface 56a of the shaft passage hole 56 face each other with slight clearance, if an external force is applied to the housing 36, a large part of the external force is borne by the pressing abutment of the inner wall surface 40a and outer wall surface 40b of the annular wall 40 against the ribs 59 and 61 on the inner wall surface 58a and outer wall surface 58b of the annular wall housing groove 58 while the remaining part of the external force is borne by the pressing abutment between the outer circumferential surface 38b of the shaft 38 and the inner circumferential surface 56a of the shaft passage hole 56. This reduces the force applied to the shaft 38 and more reliably prevents the shaft 38 from being bent or broken.

According to the embodiment described above, since the annular wall 40 is hidden by being housed in the annular wall housing groove 58, the door mirror ensures appearance equivalent to that of conventional vehicle door mirrors. Also, since the mirror-rotating-member-side portion 54 and base-side portion 60 of the clutch are placed on the inner circumferential side of the annular wall 40 and annular wall housing groove 58, there is no need for a exclusive radial width (additional radial width provided, around the rotation axis S, on the housing support member 34 and base 32 in order to form the clutch) used for placing the clutch on the outer circumferential side of the annular wall 40 and annular wall housing groove 58. Also, the harness 62, which is passed through the hollow part 38a of the shaft 38, can be laid out easily. Besides, since the coil spring 46 is placed on the inner circumferential side of the annular wall housing groove 58, the coil spring 46 can be reduced in diameter.

Second Embodiment of Manually Retractable Door Mirror

Figure 13:
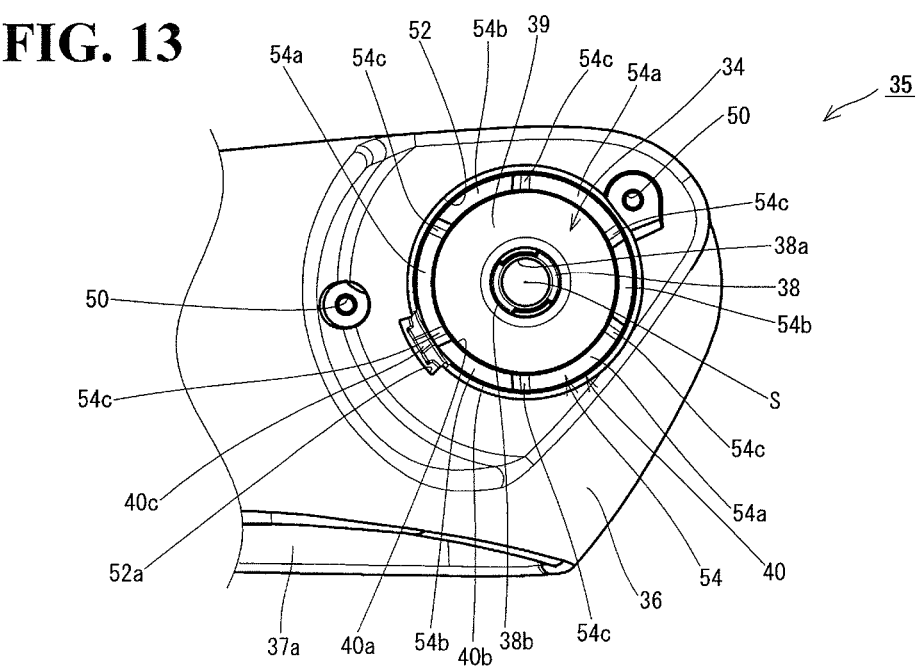
FIG. 13 is a diagram showing how the housing support member 34 is housed in the depression 42 in the housing 36 as viewed from the bottom side of the housing 36 of a manually retractable door mirror according to a second embodiment of the present invention configured using the common base for manually retractable and electrically retractable door mirrors according to the present invention.
Figure 14:
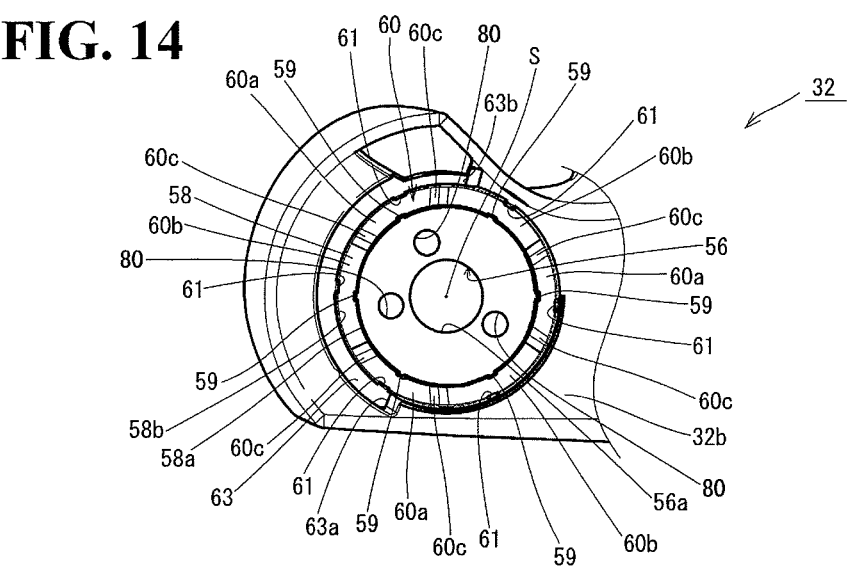
FIG. 14 is a plan view of the rotation support section 32b of the base 32 in the manually retractable door mirror according to the second embodiment of the present invention.
Figure 15:
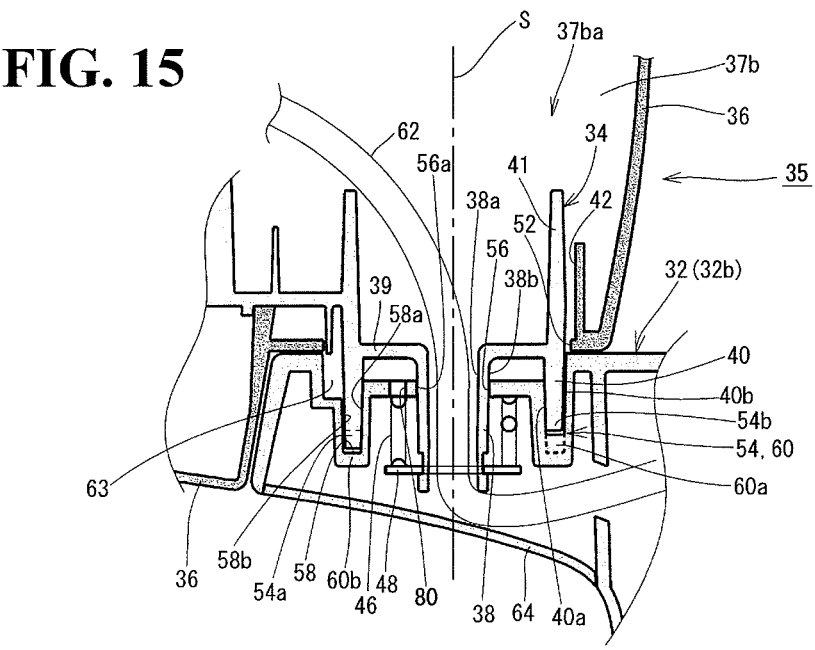
FIG. 15 is a partial sectional view of the manually retractable door mirror according to the second embodiment of the present invention cut along a plane passing through the rotation axis S when the housing 36 is at the return position.

A second embodiment of a manually retractable door mirror according to the present invention configured using the common base for manually retractable and electrically retractable door mirrors according to the present invention is shown in FIGS. 13 to 15. According to the present embodiment, the mirror-rotating-member-side portion 54 of the clutch is placed on top of the annular wall 40 and the base-side portion 60 of the clutch is formed in the bottom of the annular wall housing groove 58. The rest of the configuration is the same as the first embodiment. FIG. 13 is a diagram showing how the housing support member 34 is placed (FIG. 3) in the depression 42 (FIG. 2) in the housing 36 as viewed from the bottom side of the housing 36 (FIG. 13 corresponds to FIG. 4 according to the first embodiment). FIG. 14 is a plan view of the rotation support section 32b of the base 32 (FIG. 14 corresponds to FIG. 8 according to the first embodiment). FIG. 15 is a sectional view taken along a plane passing through the rotation axis S when the housing 36 is at the return position (FIG. 15 corresponds to FIG. 6 according to the first embodiment). The same components as those in the first embodiment are denoted by the same reference numerals as the corresponding components in the first embodiment. The present embodiment eliminates the need for a exclusive radial width used for placing the clutch, making it possible to reduce the diameter needed for the base 32 to rotate relative to the housing support member 34. The door mirror according to the present embodiment operates in a manner similar to the door mirror according to the first embodiment.

Although, in the first and second embodiments of the manually retractable door mirror, the housing 36 and housing support member 34 are configured as separate components which are assembled subsequently, the housing 36 and housing support member 34 may be configured as a one-piece molding or one-piece casting. Also, although in the first and second embodiments of the manually retractable door mirror, the plate 48 is used to restrain the coil spring 46 to the shaft 38, the plate 48 can be omitted if a plate-side end of the coil spring 46 is restrained directly to the shaft 38. Also, although the coil spring 46 is used in the first and second embodiments, a disc spring or leaf spring may be used alternatively.

Embodiment of Electrically Retractable Door Mirror

Figure 16:
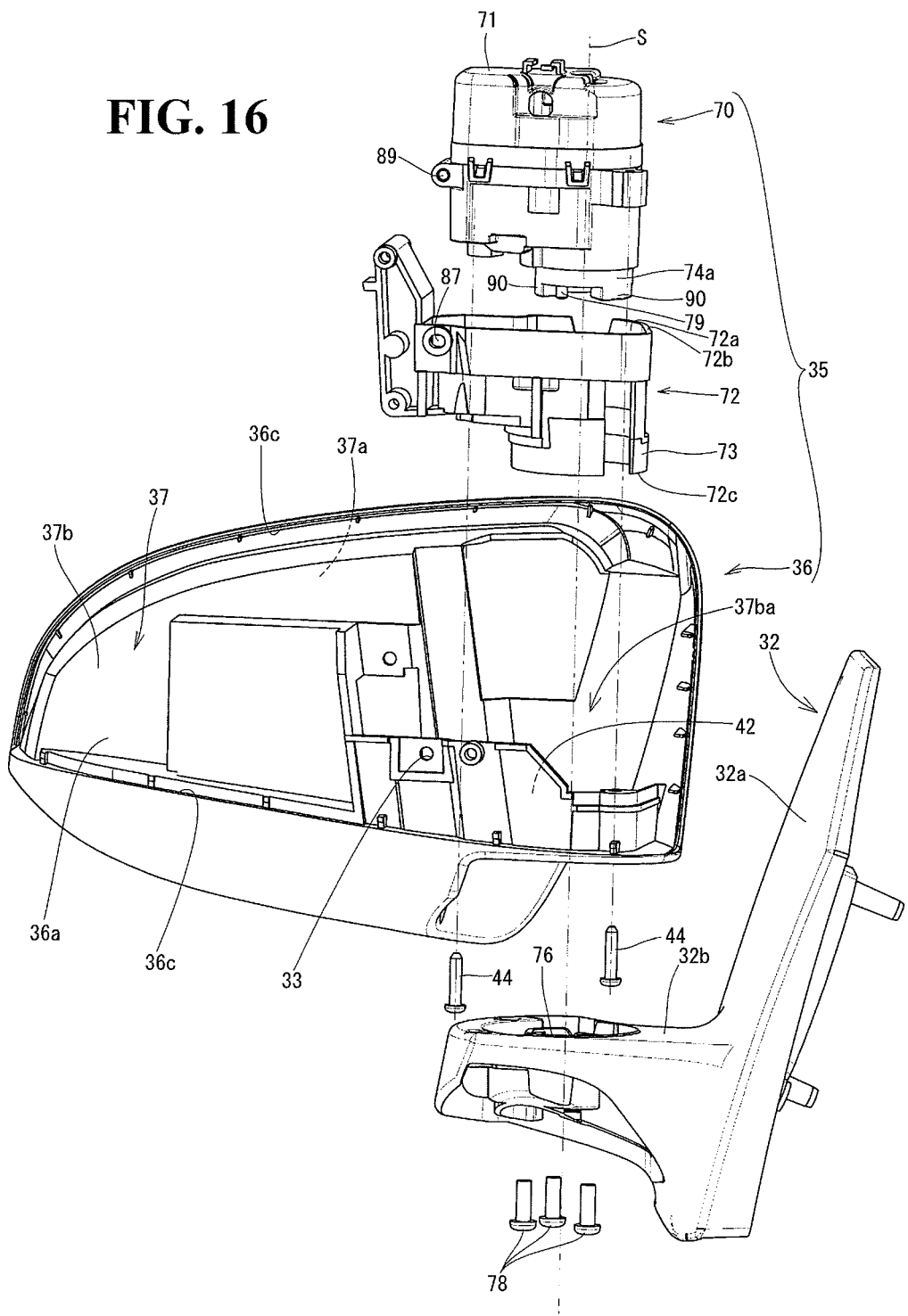
FIG. 16 is an exploded perspective view showing principal part of an embodiment of an electrically retractable door mirror according to the present invention configured using the common base for manually retractable and electrically retractable door mirrors used in the first embodiment of the manually retractable door mirror.
Figure 20:
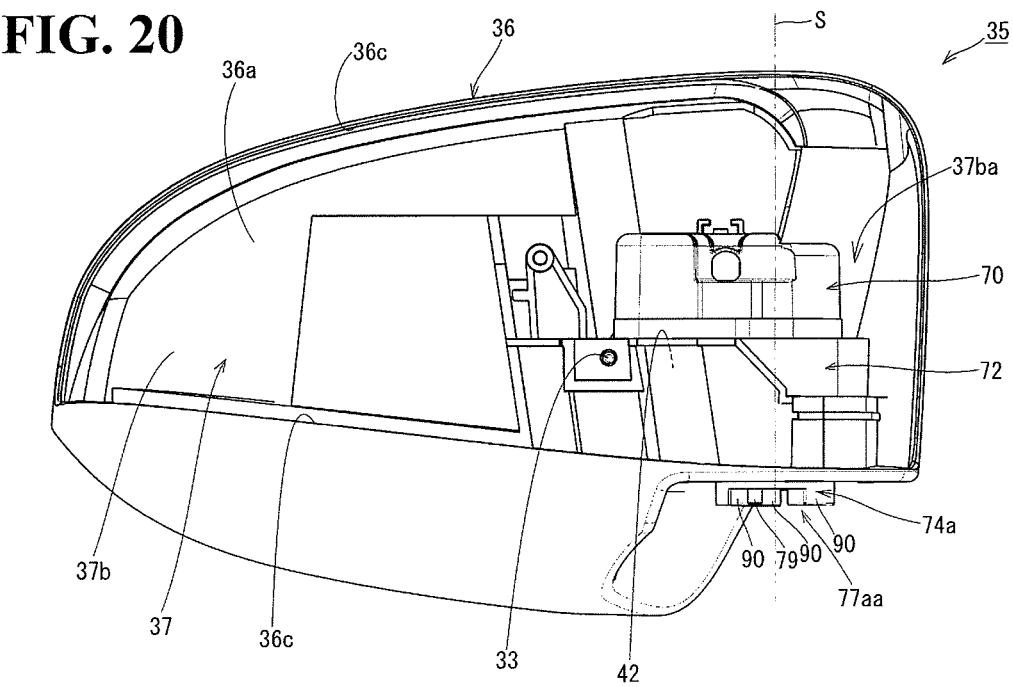
FIG. 20 is a rear view of the assembled components shown in FIG. 18.
Figure 21:
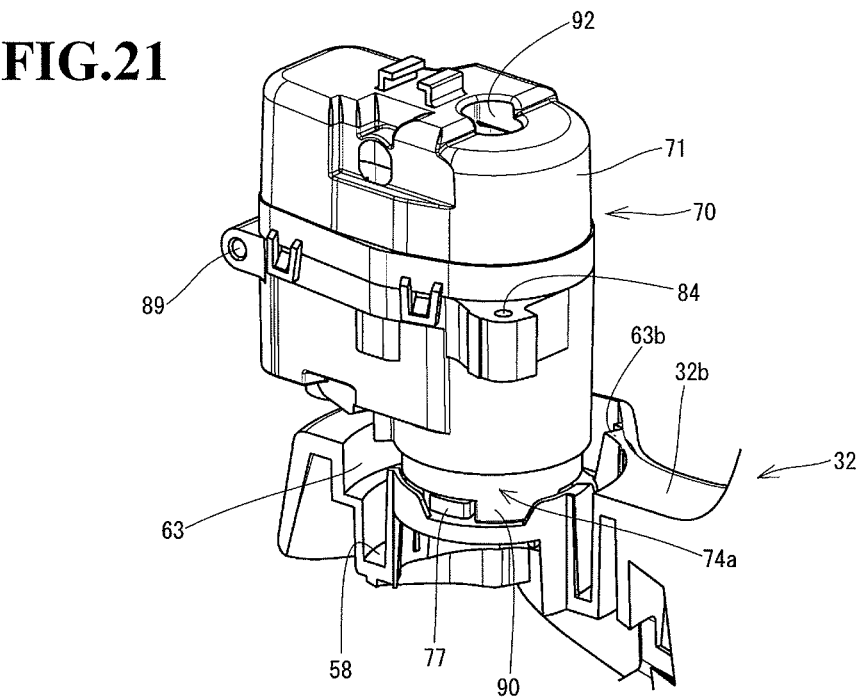
FIG. 21 is a perspective view showing how the electric drive mechanism 70 is placed and supported on the rotation support section 32b of the base 32 shown in FIG. 16.
Figure 22:
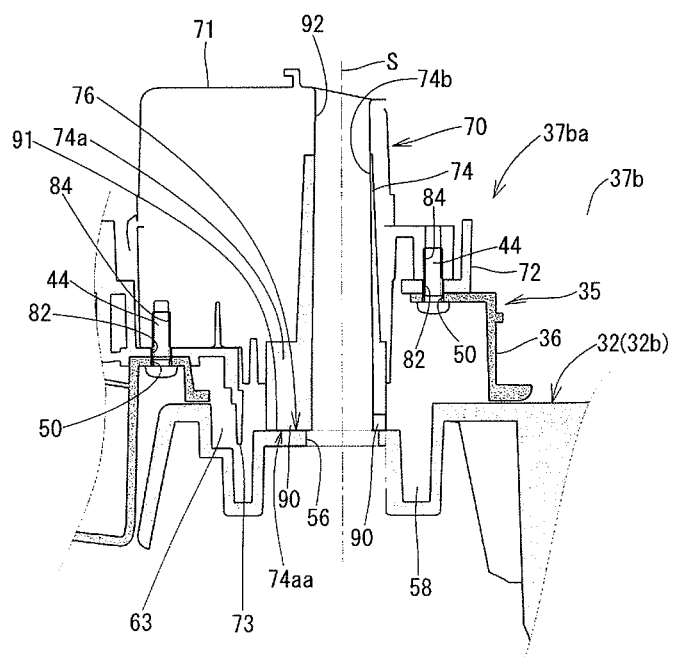
FIG. 22 is a partial sectional view (which corresponds to a cross section taken along line D-D in FIG. 19) taken at the position where the housing 36, fitting 72, and electric drive mechanism 70 of the electrically retractable door mirror in FIG. 16 are fixedly coupled.
Figure 23:
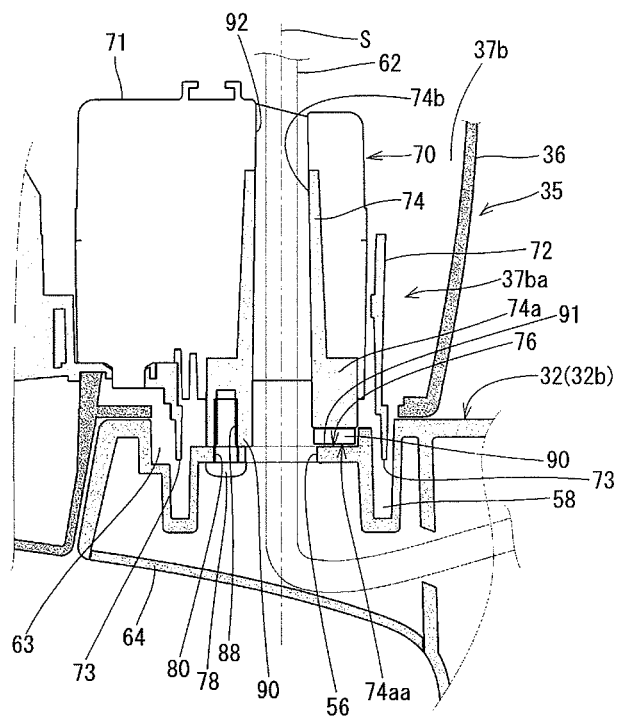
FIG. 23 is a partial sectional view (which corresponds to a cross section taken along line C-C in FIGS. 8 and 19) taken at the position where a shaft 74 of the electric drive mechanism 70 is fastened upright on the base 32 in the electrically retractable door mirror in FIG. 16.

An embodiment of an electrically retractable door mirror according to the present invention is shown in FIGS. 16 to 23, where the embodiment is configured using the common base 32 for manually retractable and electrically retractable door mirrors described in the first embodiment of the manually retractable door mirror. The same components as those in the first embodiment of the manually retractable door mirror are denoted by the same reference numerals as the corresponding components in the first embodiment of the manually retractable door mirror. FIG. 16 is an exploded view showing a configuration of the electrically retractable door mirror according to the present embodiment. FIG. 16 shows a right door mirror as viewed from the rear. A housing cover mounted on the rear side of the housing 36, a mirror angle adjustment actuator, a mirror plate, and the like are not shown in FIG. 16. The door mirror includes the base 32 attached to the outer side of a car body, an electric drive mechanism 70, a fitting 72, and the housing 36. The fitting 72 is interposed between the electric drive mechanism 70 and housing 36 to fixedly couple the electric drive mechanism 70 to housing 36. The fitting 72 is a one-piece molding of rigid plastics such as PA+GF resin or a one-piece casting of metal such as aluminum. The fitting 72 includes an inner space 72*a* used to house the electric drive mechanism 70 fitted through an upper opening 72*b*. An opening 72*c* is formed in an undersurface of the fitting 72 to downwardly expose an undersurface 74*aa* of a shaft 74 (FIGS. 22 and 23). The fitting 72 includes an annular wall 73 protruding downward. The annular wall 73 is housed in the annular wall housing groove 58 of the base 32 without contact (FIGS. 22 and 23). As shown in FIG. 17, in some circumferential area on an outer circumferential surface of the annular wall 73, a stopper 73*a* is formed, protruding radially outward. As in the case of the manually retractable door mirror, being placed in a stopper traveling groove 63 formed in some circumferential area around the rotation axis S at a location on the outer circumferential side of the annular wall housing groove 58 of the base 32 in FIG. 8, the stopper 73*a* moves along the stopper traveling groove 63 as the fitting 72 rotates and is restrained by abutting against opposite ends 63*a* and 63*b* of the stopper traveling groove 63. The stopper 73*a* is restrained by the end 63*a* at the forward folded position of the housing 36 and restrained by the end 63*b* at the retracted position (backward folded position) of the housing 36. Since the stopper 73*a* is formed on the outer circumferential surface of the annular wall 73, the stopper 73*a* can be supported more firmly than when the stopper 73*a* is coupled to the fitting 72 by its base alone without the annular wall 73. This prevents the stopper 73*a* from being broken. Conversely, the stopper traveling groove 63 may be formed at a location just on the inner circumferential side of the annular wall housing groove 58 and the stopper 73*a* may be formed on an inner circumferential surface of the annular wall 73, protruding therefrom. As shown in FIG. 17, on the front side the fitting 72, screw holes 67 and 69 (which correspond to the screw holes 29 and 31 of the housing support member 34 in FIG. 7) are formed to screw and support part of the mirror angle adjustment actuator. Referring to FIG. 16, the electric drive mechanism 70 is housed and held in the inner space 72*a* of the fitting 72, housed and held in the depression 42 in the housing 36 together with the fitting 72, placed in an electric drive mechanism placement space 37*ba* (in common with the housing support member placement space of the manually retractable door mirror), and fixedly supported by the housing 36 together with the fitting 72 using screws 44. In this way, the mirror rotating member 35 is constructed by integrating the electric drive mechanism 70 housed in the fitting 72 with the housing 36. The base 32, housing 36, and housing cover are the same as those described in the first embodiment of the manually retractable door mirror. Incidentally, if external shape of the electric drive mechanism 70 and internal shape of the depression 42 are designed such that the electric drive mechanism 70 will be housed and held directly in the depression 42 of the housing 36, the need for the fitting 72 can be eliminated.

Figure 19:
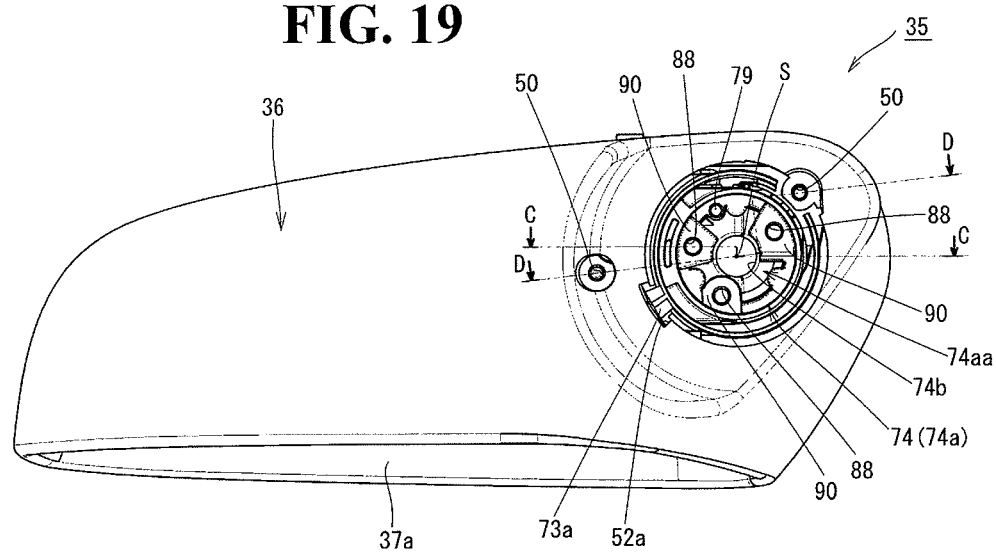
FIG. 19 is a bottom view of the assembled components shown in FIG. 18.

The electric drive mechanism 70 has a configuration similar to that of an electric drive mechanism of conventional electrically retractable door mirrors and includes a hollow round metal bar shaft 74 (FIGS. 22 and 23), motor, gear, clutch mechanism, coil spring, electronic circuit board, and the like housed and placed in a casing 71. The shaft 74 is placed coaxially with the rotation axis S. The undersurface 74*aa* of a basal part 74*a* of the shaft 74 is exposed through the undersurface of the housing 36. As shown in FIG. 19, in lower part of the basal part 74*a* of the shaft 74, legs 90 is formed in protrusion at three locations around the rotation axis S. Screw holes 88 are formed in an undersurface of each leg 90. Also, a positioning pin 79 is formed in protrusion in the lower part of the basal part 74*a* of the shaft 74 as shown in FIG. 19. A hollow part 74*b* is formed in the center of the shaft 74, piercing the length of the shaft 74. A lower end of the hollow part 74*b* opens up in a central part of the undersurface 74*aa* of a basal part 74*a*. An upper end of the hollow part 74*b* opens above the electric drive mechanism 70 by communicating with a hollow part 92 (FIGS. 22 and 23) formed in an upper part of the casing 71 of the electric drive mechanism 70.

An upright shaft fastening surface 76 (FIGS. 8 and 9) is provided in a central part of an upper surface of the base 32. As shown in FIGS. 8 and 9, on the upright shaft fastening surface 76, walls 77 and a boss 75 are formed in protrusion. That area of the upright shaft fastening surface 76 which is free from the walls 77 and boss 75 provides a leg supporting surface 91 which supports the legs 90. Screw through-holes 80 are formed in the leg supporting surface 91. A pin-receiving hole 81 is formed in the boss 75. The shaft 74 is supported on the upright shaft fastening surface 76 with the legs 90 placed on the leg supporting surface 91. In this state, the walls 77 and boss 75 are fitted in spaces among the legs 90 and the pin 79 is received in the pin-receiving hole 81. As a result of the engagement (fit) between concavo-convexities on the upright shaft fastening surface 76 and concavo-convexities on the undersurface 74*aa* of the shaft 74, the shaft 74 is positioned on the base 32 with its center axis aligned with the rotation axis S. In a state where the shaft 74 is positioned on the base 32, three screws 78 (FIG. 16) are passed through the screw through-holes 80 from the underside of the base 32 and screwed into the screw holes 88 formed in the undersurfaces of the legs 90. Consequently, the shaft 74 is fastened upright on the base 32 (FIG. 23). When the shaft 74 is fastened upright on the base 32, the center hole 56 (shaft passage hole in the case of the manually retractable door mirror) of the base 32, the hollow part 74*b* of the shaft 74, and the hollow part 92 of the casing 71 are communicated with each other to form a harness passage hole.

The electrically retractable door mirror in FIG. 16 is assembled, for example, as follows.

(1) The electric drive mechanism 70 is fitted and housed in the inner space 72*a* of the fitting 72 through the upper opening 72b of the fitting 72. Consequently, with an approximately lower half of the electric drive mechanism 70 fitted in the inner space 72a, the fitting 72 is mounted on the electric drive mechanism 70. In the meantime, the undersurface 74aa of the basal part 74a of the shaft 74 of the electric drive mechanism 70 is exposed downward through the lower opening 72c of the fitting 72.

Figure 18:
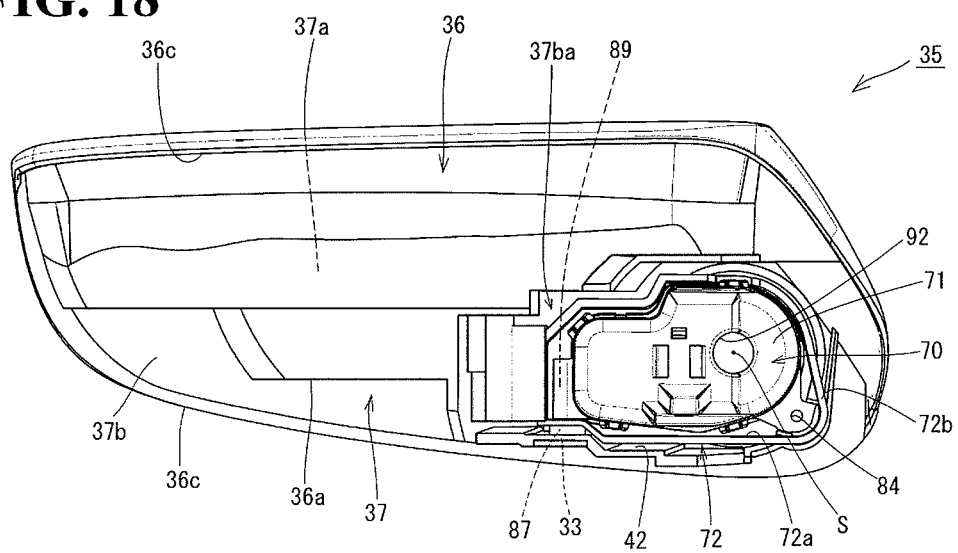
FIG. 18 is a diagram showing how an electric drive mechanism 70 is housed in the depression 42 in the housing 36 via the fitting 72 and placed in an electric drive mechanism placement space 37ba in the electrically retractable door mirror in FIG. 16.

(2) The electric drive mechanism 70 with the fitting 72 attached is housed in the depression 42 of the housing 36 from above. FIGS. 18, 19 and 20 are a plan view, bottom view, and rear view showing the assembled components, respectively.

(3) Screws 44 (FIG. 16) are separately inserted through two screw through-holes 50 (FIG. 19) formed in the undersurface of the housing 36 and are screwed into screw holes in the undersurface of the electric drive mechanism 70 to fixedly couple the housing 36 and electric drive mechanism 70 to each other. FIG. 22 shows a cross section (which corresponds to a cross section taken along line D-D in FIG. 19) taken at the position where the electric drive mechanism 70 and housing 36 are fixedly coupled. As shown in FIG. 22, the electric drive mechanism 70 and housing 36 are fixedly coupled to each other as the screws 44 are inserted through the screw through-holes 50 formed in the housing 36 and screwed into screw holes 84 formed in the electric drive mechanism 70 via through-holes 82 formed in the fitting 72.

(4) With the center axis of the shaft 74 aligned with the rotation axis S, the basal part 74a of the shaft 74 exposed through the undersurface of the housing 36 is mounted on the upright shaft fastening surface 76 of the base 32. FIG. 21 shows, with the fitting 72 and housing 36 removed, how the electric drive mechanism 70 is mounted on the rotation support section 32b of the base 32. As a result of engagement between the legs 90 and walls 77 as well as engagement between the pin 79 (FIG. 19) and pin-receiving hole 81 (FIGS. 8 and 9), the basal part 74a of the shaft 74 is positioned on the upright shaft fastening surface 76 of the base 32.

(5) From the reverse side of the rotation support section 32b of the base 32, the screws 78 (FIG. 16) are inserted into the screw through-holes 80 (FIG. 8) and screwed into the screw holes 88 (FIG. 19) formed in the undersurface 74aa of the shaft 74. Consequently, the shaft 74 is fastened upright on the rotation support section 32b, the mirror rotating member 35 and rotation support section 32b are coupled to each other in such a way that the mirror rotating member 35 is able to rotate around the rotation axis S. FIGS. 22 and 23 are sectional views showing a resulting state.

(6) A screw (not shown) is inserted into the screw through-hole 33 (FIG. 1) in the rear side of the housing 36, passed through a screw through-hole 87 (FIG. 16) in the fitting 72, and screwed into a screw hole 89 (FIG. 16) in the electric drive mechanism 70, thereby reinforcing the coupling among the housing 36, fitting 72, and electric drive mechanism 70.

(7) The housing cover is attached to an opening (a region surrounded by edges 36c shown in FIGS. 16, 18 and 20) in the reverse side of the housing 36. Consequently, the electric drive mechanism 70 excluding the basal part 74a of the shaft 74 protruding from the undersurface of the housing 36 has been housed in the inner space 37 of the housing 36.

(8) The mirror angle adjustment actuator is mounted in the front space 37a of the housing 36, and then the mirror plate is mounted on the mirror angle adjustment actuator.

FIG. 23 is a sectional view taken at the position corresponding to line C-C in FIGS. 8 and 19 when the housing 36 is at the return position after the door mirror in FIG. 16 is assembled. The harness 62 used to supply electric drive power to the electric drive mechanism 70, mirror angle adjustment actuator, and the like is passed through the hollow part 74b of the shaft 74 and the hollow part 92 of the casing 71 communicated with each other. A lower opening of the base 32 is closed by a lid 64. When a motor in the electric drive mechanism 70 is operated, the casing 71 of the electric drive mechanism 70 rotates on the shaft 74 fastened upright on the rotation support section 32b of the base 32, causing the housing 36 coupled to the casing 71 to rotate around the rotation axis S within an angular range permitted by the stopper 73a (FIG. 17) and thereby move from the return position to the retracted position or from the retracted position to the return position. If an external force acts on the housing 36 in the forward direction of the vehicle when the housing 36 is at the return position, since the clutch is disengaged in the electric drive mechanism 70 by overcoming the urging force of the coil spring, the housing 36 moves to the forward tilted position (forward folded position) and thereby releases the external force.

In the example described above, the electrically retractable door mirror according to the present invention is configured using the common base for manually retractable and electrically retractable door mirrors described in the first embodiment of the manually retractable door mirror, but the electrically retractable door mirror according to the present invention can also be configured using the common base for manually retractable and electrically retractable door mirrors described in the second embodiment of the manually retractable door mirror.

Embodiment of Method for Selectively Manufacturing Manually Retractable/Electrically Retractable Door Mirror If multiple units of the common base 32 for manually retractable and electrically retractable door mirrors described in the first embodiment of the manually retractable door mirror are prepared, some of the units can be used to manufacture the first embodiment of the manually retractable door mirror described above and other units can be used to manufacture the embodiment of the electrically retractable door mirror described above. Similarly, if multiple units of the common base 32 for manually retractable and electrically retractable door mirrors described in the second embodiment of the manually retractable door mirror are prepared, some of the units can be used to manufacture the second embodiment of the manually retractable door mirror described above and other units can be used to manufacture the embodiment of the electrically retractable door mirror described above.

What is claimed is:

1. A common base for manually retractable and electrically retractable vehicle door mirrors, the common base comprising:

a car body fixing section configured to be attached to an outer side of a car body, and a rotation support section which is integral with the car body fixing section and is configured to rotatably support a mirror rotating member of one of an electrically retractable door mirror and a manually retractable door mirror, the rotation support section being configured to move the mirror rotating member of the one of the electrically retractable door mirror and the manually retractable door mirror between a retracted position and a return position, the common base further comprising on an upper side of the rotation support section:

an upright shaft fastening surface that is configured to fasten a rotatable shaft for the mirror rotating member of the electrically retractable door mirror;

a center hole formed in a center of the upright shaft fastening surface, the center hole, when the common base is used for the manually retractable door mirror, being configured to rotatably pass a rotatable shaft of the mirror rotating member of the manually retractable door mirror that is formed along a rotation axis of the mirror rotating member of the manually retractable door mirror and protrudes downward from a bottom side of the mirror rotating member of the manually retractable door mirror, the center hole, when the common base is used for the electrically retractable door mirror, being configured to pass a harness drawn downward through the rotatable shaft of the mirror rotating member of the electrically retractable door mirror; and an annular wall housing groove formed into a circular shape coaxially with the center hole on an outer circumferential side of the center hole and configured to rotatably house an annular wall of the mirror rotating member of the manually retractable door mirror when the common base is used for the manually retractable door mirror, and wherein the annular wall housing groove is configured to be placed coaxially with the rotatable shaft of the mirror rotating member of the manually retractable door mirror at a location on an outer circumferential side of the rotatable shaft of the mirror rotating member of the manually retractable door mirror.

2. The common base according to claim 1, further comprising a base-side portion of a clutch which is configured to engage a minor-rotating-member-side portion of the clutch when the common base is used for the manually retractable door mirror, where the base-side portion of the clutch is formed into a concavo-convex shape by being exposed upward at a location on the outer circumferential side of the center hole of the rotation support section and extending around the rotation axis and configured to engage the mirror-rotating-member-side portion of the clutch formed on the side of the mirror rotating member of the manually retractable door mirror and having a concavo-convex shape corresponding to the concavo-convex shape of the base-side portion of the clutch.

3. A manually retractable vehicle door mirror assembly comprising:

the common base according to claim 2;

the mirror rotating member, of the manually retractable door mirror having the rotatable shaft, the annular wall, and the mirror-rotating-member-side portion of the clutch, being provided on the common base and rotatably supported on the common base such that the rotatable shaft of the manually retractable door mirror is inserted into the center hole in the upright shaft fastening surface of the common base and the annular wall, of the mirror rotating member of the manually retractable door mirror having the rotatable shaft, is rotatably housed in the annular wall housing groove of the common base; and a spring which is fitted, in a compressed state, over the rotatable shaft of the manually retractable door mirror, the spring extending toward an underside of the common base, and the spring applying an urging force in such a direction along the rotation axis to push the common base and the mirror rotating member of the manually retractable door mirror toward each other, thereby bringing the mirror-rotating-member-side portion and the base-side portion of the clutch into pressing contact with each other.

4. The manually retractable vehicle door mirror assembly according to claim 3, wherein:

the common base has a stopper traveling groove adjacent to an outer circumferential side or an inner circumferential side of the annular wall housing groove;

the mirror rotating member of the manually retractable door mirror has a stopper protruding radially from the annular wall; and the stopper is moved along the stopper traveling groove as the mirror rotating member of the manually retractable door mirror rotates, and restrained by abutting against an end of the stopper traveling groove.

5. An electrically retractable vehicle door mirror assembly comprising:

the common base according to claim 2;

the rotatable shaft for the mirror rotating member of the electrically retractable door mirror fastened upright on the upright shaft fastening surface;

the mirror rotating member of the electrically retractable door mirror being rotatably supported around an axis of the rotatable shaft for the mirror rotating member of the electrically retractable door mirror and rotatably driven on the rotatable shaft for the mirror rotating member of the electrically retractable door mirror by a rotating force transmitted from a built-in electric drive mechanism.

6. The electrically retractable vehicle door mirror assembly according to claim 5, wherein:

the common base has a stopper traveling groove adjacent to an outer circumferential side or an inner circumferential side of the annular wall housing groove;

the mirror rotating member of the electrically retractable door mirror has an annular wall, and a stopper protruding radially from the annular wall of the mirror rotating member of the electrically retractable door mirror; and the stopper is moved along the stopper traveling groove as the mirror rotating member of the electrically retractable door mirror rotates, and restrained by abutting against an end- of the stopper traveling groove.

7. A method for selectively manufacturing a manually retractable vehicle door mirror assembly and an electrically retractable vehicle door mirror assembly, wherein the method of manufacturing the manually retractable vehicle door mirror assembly comprises:

selecting the common base according to claim 2;

equipping the common base with the mirror rotating member of the manually retractable door mirror having the rotatable shaft, the annular wall, and the mirror-rotating-member-side portion of the clutch, and the mirror rotating member of the manually retractable door mirror being rotatably supported on the common base such that rotatable shaft of the manually retractable door mirror is inserted into the center hole in the upright shaft fastening surface of the common base and the annular wall of the mirror rotating member of the manually retractable door mirror is housed in the annular wall housing groove of the common base; and fitting a spring which, in a compressed state, over the rotatable shaft of the mirror rotating member of the manually retractable door mirror, the spring extending toward an underside of the common base, and the spring applying an urging force in such a direction along the rotation axis as to push the common base and the mirror rotating member of the manually retractable door mirror toward each other, thereby bringing the minor-rotating-member-side portion and base-side portion of the clutch into pressing contact with each other, and manufacturing an electrically retractable vehicle door mirror assembly comprising:
  selecting another common base according to claim 2;
  fastening the rotatable shaft for the mirror rotating member of the electrically retractable door mirror upright on the upright shaft fastening surface;
  the minor rotating member of the electrically retractable door mirror being rotatably supported around an axis of the rotatable shaft for the mirror rotating member of the electrically retractable door mirror and rotatably driven on the rotatable shaft for the mirror rotating member of the electrically retractable door mirror by a rotating force transmitted from a built-in electric drive mechanism.

8. A manually retractable vehicle door mirror assembly comprising:
  the common base according to claim 1;
  the mirror rotating member, of the manually retractable door mirror having the rotatable shaft and the annular wall, being provided on the common base and rotatably supported on the common base such that the rotatable shaft of the mirror rotating member of the manually retractable door mirror is inserted into the center hole in the upright shaft fastening surface of the common base and the annular wall, of the mirror rotating member of the manually retractable door mirror, is rotatably housed in the annular wall housing groove of the common base; and
  a spring which is fitted, in a compressed state, over the rotatable shaft of the mirror rotating member of the manually retractable door mirror, the spring extending toward an underside of the common base, and the spring applying an urging force in such a direction along the rotation axis to push the common base and the mirror rotating member of the manually retractable door mirror toward each other.

9. The manually retractable vehicle door mirror assembly according to claim 8, wherein:
  the common base has a stopper traveling groove adjacent to an outer circumferential side or an inner circumferential side of the annular wall housing groove;
  the mirror rotating member of the manually retractable door mirror has a stopper protruding radially from the annular wall; and
  the stopper is moved along the stopper traveling groove as the mirror rotating member of the manually retractable door mirror rotates, and restrained by abutting against an end of the stopper traveling groove.

10. An electrically retractable vehicle door mirror assembly comprising:
  the common base according to claim 1;
  the rotatable shaft for the mirror rotating member of the electrically retractable door mirror fastened upright on the upright shaft fastening surface;
  the mirror rotating member of the electrically retractable door mirror being rotatably supported around an axis of the rotatable shaft for the mirror rotating member of the electrically retractable door mirror, and the mirror rotating member of the electrically retractable door mirror being rotatably driven on the rotatable shaft for the mirror rotating member of the electrically retractable door mirror by a rotating force transmitted from a built-in electric drive mechanism.

11. The electrically retractable vehicle door mirror assembly according to claim 10, wherein:
  the common base has a stopper traveling groove adjacent to an outer circumferential side or an inner circumferential side of the annular wall housing groove;
  the mirror rotating member of the electrically retractable door mirror having an annular wall, and a stopper protruding radially from the annular wall of the mirror rotating member of the electrically retractable door mirror; and
  the stopper is moved along the stopper traveling groove as the mirror rotating member of the electrically retractable door mirror rotates, and restrained by abutting against an end of the stopper traveling groove.

12. A method for selectively manufacturing a manually retractable vehicle door mirror assembly and an electrically retractable vehicle door mirror assembly, wherein the method
  of manufacturing the manually retractable vehicle door mirror assembly comprises:
  selecting the common base according to claim 1;
  equipping the common base with the mirror rotating member of the manually retractable door mirror having the rotatable shaft and the annular wall, and the mirror rotating member of the manually retractable door mirror being rotatably supported on the common base such that the rotatable shaft of the mirror rotating member of the manually retractable door mirror is inserted into the center hole in the upright shaft fastening surface of the common base and the annular wall of the mirror rotating member of the manually retractable door minor is housed in the annular wall housing groove of the common base; and
  fitting a spring, in a compressed state, over the rotatable shaft of the mirror rotating member of the manually retractable door mirror, the spring extending toward an underside of the common base, and the spring applying an urging force in such a direction along the rotation axis as to push the common base and the mirror rotating member of the manually retractable door minor toward each other, and
  manufacturing an electrically retractable vehicle door mirror assembly comprising:
    selecting another common base according to claim 1;
    fastening the rotatable shaft for the mirror rotating member of the electrically retractable door mirror upright on the upright shaft fastening surface;
    the minor rotating member of the electrically retractable door mirror being rotatably supported around an axis of the rotatable shaft for the mirror rotating member of the electrically retractable door mirror, and the mirror rotating member of the electrically retractable door mirror being rotatably driven on the rotatable shaft for the mirror rotating member of the electrically retractable door mirror by a rotating force transmitted from a built-in electric drive mechanism.

* * * * *